United States Patent
Danilov et al.

(10) Patent No.: US 10,061,697 B2
(45) Date of Patent: Aug. 28, 2018

(54) GARBAGE COLLECTION SCOPE DETECTION FOR DISTRIBUTED STORAGE

(71) Applicant: EMC Corporation, Hopkinton, MA (US)

(72) Inventors: Mikhail Danilov, Saint Petersburg (RU); Shashwat Srivastav, Seattle, WA (US); Mikhail Malygin, Saint Petersburg (RU); Chen Wang, Shanghai (CN); Ivan Tchoub, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 267 days.

(21) Appl. No.: 15/193,142

(22) Filed: Jun. 27, 2016

(65) Prior Publication Data

US 2017/0177473 A1    Jun. 22, 2017

(30) Foreign Application Priority Data

Dec. 16, 2015  (RU) .................................. 2015153849

(51) Int. Cl.
  *G06F 17/30*  (2006.01)
  *G06F 12/02*  (2006.01)
  *G06F 3/06*  (2006.01)

(52) U.S. Cl.
  CPC .......... *G06F 12/0261* (2013.01); *G06F 3/064* (2013.01); *G06F 3/0608* (2013.01); *G06F 3/0683* (2013.01); *G06F 17/30327* (2013.01); *G06F 2212/1044* (2013.01)

(58) Field of Classification Search
  CPC .... G06F 12/0261; G06F 3/0608; G06F 3/064; G06F 3/0683; G06F 17/30327
  See application file for complete search history.

(56) References Cited

U.S. PATENT DOCUMENTS

| | | | |
|---|---|---|---|
| 5,758,347 A * | 5/1998 | Lo | G06F 17/30 |
| 6,070,003 A | 5/2000 | Gove et al. | |
| 6,550,035 B1 | 4/2003 | Okita | |
| 7,549,110 B2 | 6/2009 | Stek et al. | |
| 7,559,007 B1 | 7/2009 | Wilkie | |
| 7,581,156 B2 | 8/2009 | Manasse | |
| 7,707,232 B2 * | 4/2010 | Dussud | G06F 12/0276 707/819 |
| 8,458,515 B1 | 6/2013 | Saeed | |
| 8,532,212 B2 | 9/2013 | Ito | |
| 8,683,296 B2 | 3/2014 | Anderson et al. | |
| 8,683,300 B2 | 3/2014 | Stek et al. | |
| 8,762,642 B2 | 6/2014 | Bates et al. | |
| 8,914,706 B2 | 12/2014 | Anderson | |
| 9,268,806 B1 * | 2/2016 | Kesselman | G06F 17/30312 |
| 2005/0038968 A1 | 2/2005 | Iwamura et al. | |

(Continued)

OTHER PUBLICATIONS

U.S. Appl. No. 15/620,892, filed Jun. 13, 2017, Danilov et al.
(Continued)

*Primary Examiner* — Jay A Morrison
(74) *Attorney, Agent, or Firm* — Daly, Crowley Mofford & Durkee, LLP (57) ABSTRACT

Systems and methods for determining garbage collection (GC) scope in a distribute storage system using chunk-based storage. The systems and methods are compatible with multi-version concurrency control (MVCC) semantics.

12 Claims, 11 Drawing Sheets

(56) References Cited

U.S. PATENT DOCUMENTS

| | | | |
|---|---|---|---|
| 2006/0105724 A1 | 5/2006 | Nakao | |
| 2006/0147219 A1 | 7/2006 | Yoshino et al. | |
| 2008/0126357 A1 | 5/2008 | Casanova et al. | |
| 2009/0112953 A1 | 4/2009 | Barsness et al. | |
| 2010/0091842 A1 | 4/2010 | Ikeda et al. | |
| 2010/0180176 A1 | 7/2010 | Yosoku et al. | |
| 2010/0246663 A1 | 9/2010 | Citta et al. | |
| 2011/0053639 A1 | 3/2011 | Etienne Suanez et al. | |
| 2011/0055494 A1 | 3/2011 | Roberts et al. | |
| 2011/0196900 A1 | 8/2011 | Drobychev et al. | |
| 2012/0051208 A1 | 3/2012 | Li et al. | |
| 2012/0095970 A1* | 4/2012 | Shyam | G06F 17/30094 707/690 |
| 2012/0106595 A1 | 5/2012 | Bhattad et al. | |
| 2013/0067187 A1 | 3/2013 | Moss et al. | |
| 2013/0185337 A1* | 7/2013 | Lipcon | G06F 17/30138 707/813 |
| 2013/0282676 A1* | 10/2013 | Wade | G06F 17/30156 707/692 |
| 2014/0046997 A1 | 2/2014 | Dain et al. | |
| 2014/0344216 A1* | 11/2014 | Abercrombie | G06F 17/30575 707/609 |
| 2016/0098346 A1* | 4/2016 | Pechanec | G06F 12/0261 707/814 |
| 2016/0239384 A1 | 8/2016 | Slik et al. | |
| 2016/0378508 A1* | 12/2016 | Chapman | G06F 9/443 719/315 |
| 2017/0046127 A1 | 2/2017 | Fletcher et al. | |

OTHER PUBLICATIONS

U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.
Response to U.S. Non-Final Office Action dated Nov. 27, 2017 for U.S. Appl. No. 15/186,576; Response filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
U.S. Appl. No. 14/929,788, filed Nov. 2, 2015, Kurilov et al.
U.S. Appl. No. 15/083,324, filed Mar. 29, 2016, Danilov et al.
U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,409, filed Jun. 27, 2016, Trusov et al.
U.S. Non-Final Office Action dated Feb. 2, 2018 for U.S. Appl. No. 15/398,826; 16 pages.
U.S. Appl. No. 15/281,172, filed Sep. 30, 2016, Trusov et al.
U.S. Appl. No. 15/398,832, filed Jan. 5, 2017, Danilov et al.
U.S. Appl. No. 15/398,826, filed Jan. 5, 2017, Danilov et al.
U.S. Appl. No. 15/398,819, filed Jan. 5, 2017, Danilov et al.
Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.
Blömer et al., "An XOR-Based Erasure-Resilient Coding Scheme;" Article from CiteSeer; Oct. 1999; 19 Pages.
Office Action dated Nov. 27, 2017 from U.S. Appl. No. 15/186,576; 11 pages.
Office Action dated Dec. 14, 2017 from U.S. Appl. No. 15/281,172; 9 pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.
U.S. Non-Final Office Action dated Oct. 5, 2017 for U.S. Appl. No. 15/193,407; 14 pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.

* cited by examiner

GARBAGE COLLECTION SCOPE DETECTION FOR DISTRIBUTED STORAGE

CROSS REFERENCE TO RELATED APPLICATIONS

This application claims priority to Russian Application Number 2015153849, filed on Dec. 16, 2015, and entitled "GARBAGE COLLECTION SCOPE DETECTION FOR DISTRIBUTED STORAGE," which is incorporated herein by reference in its entirety.

BACKGROUND

As is known in the art, multi-version concurrency control (MVCC) is a technique used by databases and storage systems to provide concurrent access to data. With MVCC, each user (e.g., system processes and processes that handle user traffic) sees a snapshot of the data at a particular instant in time. Any changes made by a user will not be seen by other users until the changes are committed. Among other advantages, MVCC provides non-blocking access to a shared resource (e.g., data).

Many storage systems use search trees (e.g., B+ trees) to provide efficient access to stored data. Distributed storage systems (or "clusters") may manage thousands of search trees, each having a very large number (e.g., millions or even billions) of elements. Large search trees are typically stored to disk or other type of non-volatile memory.

To provide MVCC with search trees, a storage system may treat elements of a search tree as immutable. Under MVCC, a search tree may be updated by storing the new/updated data to unused portions of disk, and scheduling a tree update. During a tree update, at least one tree element is updated. In the case of a B+ tree, which includes a root node, internal nodes, and leaves, a tree update requires generating a new leaf to store the data, a new root node, and possibly new internal nodes. These new tree elements may be linked with existing tree elements to form a new search tree. Tree updates result in unused tree elements left on disk and, thus, storage systems typically include a process for detecting and reclaiming unused tree elements (referred to as "garbage collection").

In some existing storage systems, storage space may be partitioned into a set of fixed size blocks (referred to as "storage chunks"), which may store search tree elements. Under MVCC, storage chunks may be appended to, but are otherwise immutable. As a result, garbage collection can only be implemented at the chunk level, and only after it is confirmed that a storage chunk does not contain any referenced (or "live") tree elements. A storage system may include a massive number (e.g., billions) of storage chunks. Determining which chunks should be considered during garbage collection (referred to herein as "GC scope") is a complex task, particularly in the context of distributed storage systems.

SUMMARY

It is recognized herein that there is a need for a simplified approach to determining GC scope. The systems and processes describe herein provide a simplified, yet safe, approach to GC scope determination. The approach is safe because referenced storage chunks are not subject to GC.

According to one aspect of the disclosure, a method is provided use with a distributed storage system comprising a plurality of storage devices. The method comprises: initializing a garbage collection (GC) front value as the maximum sequence number associated with a storage chunk within a set of consecutively sealed storage chunks, the storage chunks corresponding to storage capacity allocated within the storage devices and having associated sequence numbers; using the GC front value to determine GC scope, the GC scope including zero or more of the storage chunks; retrieving metadata information about the GC scope storage chunks; identifying unreferenced storage chunks from the GC scope storage chunks using the metadata information; and reclaiming storage capacity corresponding to the unreferenced storage chunks.

In some embodiments, the method further comprises: sealing additional storage chunks; and advancing the GC front value if the additional sealed storage chunk have sequence numbers consecutive to a previous GC front value. In certain embodiments, the storage chunks are used to store search tree elements and advancing the GC front value comprises advancing the GC front value unless a search tree is being updated.

The method may further include: setting a first GC front block when a first search tree update commences; and setting a second GC front block when a second search tree update commences, wherein advancing the GC front value comprises advancing the GC front value after the first search tree update completes to the value of the second GC front block. In some embodiments, sealing additional storage chunks includes sealing additional storage chunks in response to a timeout expiring.

In certain embodiments of the method, retrieving metadata information about the GC candidate storage chunks comprises looking up metadata information in a metadata table using storage chunk sequence numbers.

According to another aspect of the disclosure, a distributed storage system comprises a plurality of storage devices and two or more storage nodes. The storage nodes may be configured to: initialize a garbage collection (GC) front value as the maximum sequence number associated with a storage chunk within a set of consecutively sealed storage chunks, the storage chunks corresponding to storage capacity allocated within the storage devices and having associated sequence numbers; use the GC front value to determine GC scope, the GC scope including zero or more of the storage chunks; retrieve metadata information about the GC scope storage chunks; identify unreferenced storage chunks from the GC scope storage chunks using the metadata information; and reclaim storage capacity corresponding to the unreferenced storage chunks.

In some embodiments, the two or more storage nodes are further configured to: seal additional storage chunks; and advance the GC front value if the additional sealed storage chunk have sequence numbers consecutive to a previous GC front value. In certain embodiments, the storage chunks are used to store search tree elements and the two or more storage nodes are configured to advance the GC front value unless a search tree is being updated. In various embodiments, the two or more storage nodes are configured to: set a first GC front block when a first search tree update commences; set a second GC front block when a second search tree update commences; and advance the GC front value after the first search tree update completes to the value of the second GC front block. The two or more storage nodes may be configured to seal additional storage chunks in response to a timeout expiring.

In some embodiments, the two or more storage nodes are configured lookup metadata information in a metadata table using storage chunk sequence numbers.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

Figure 1:
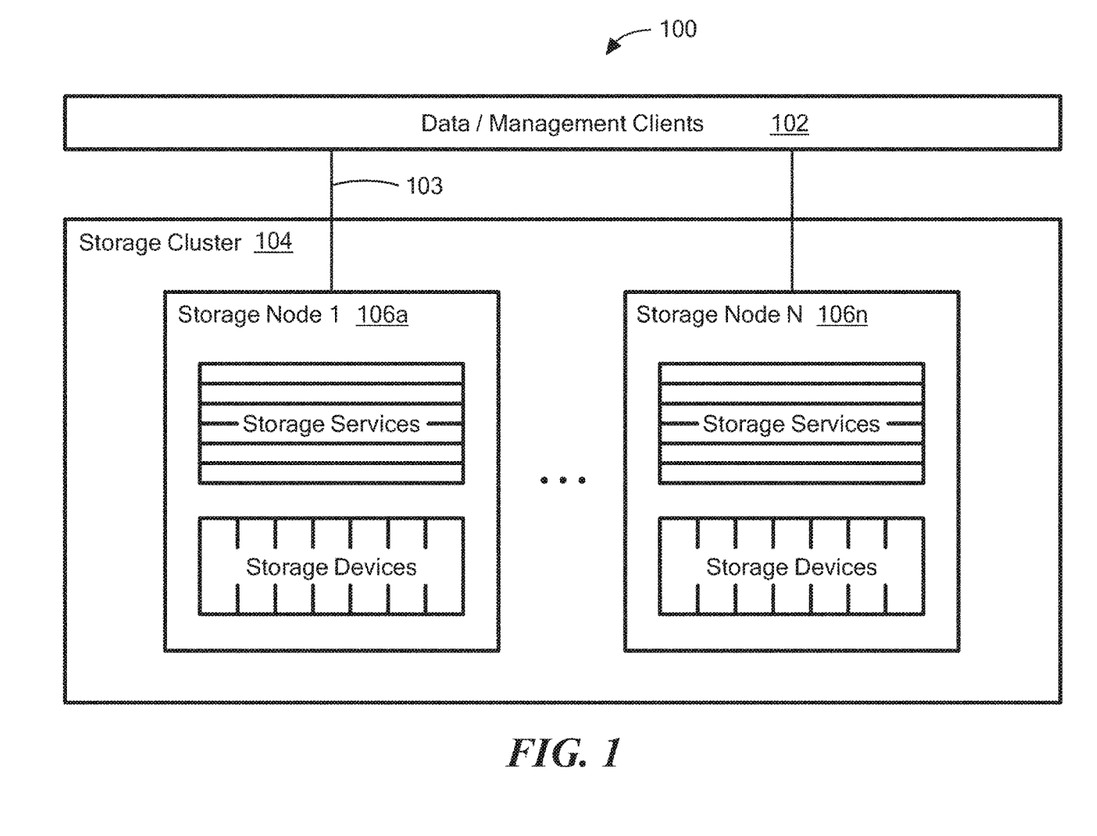
FIG. 1 is a block diagram of an illustrative distributed storage system, in accordance with an embodiment of the disclosure.
Figure 1A:
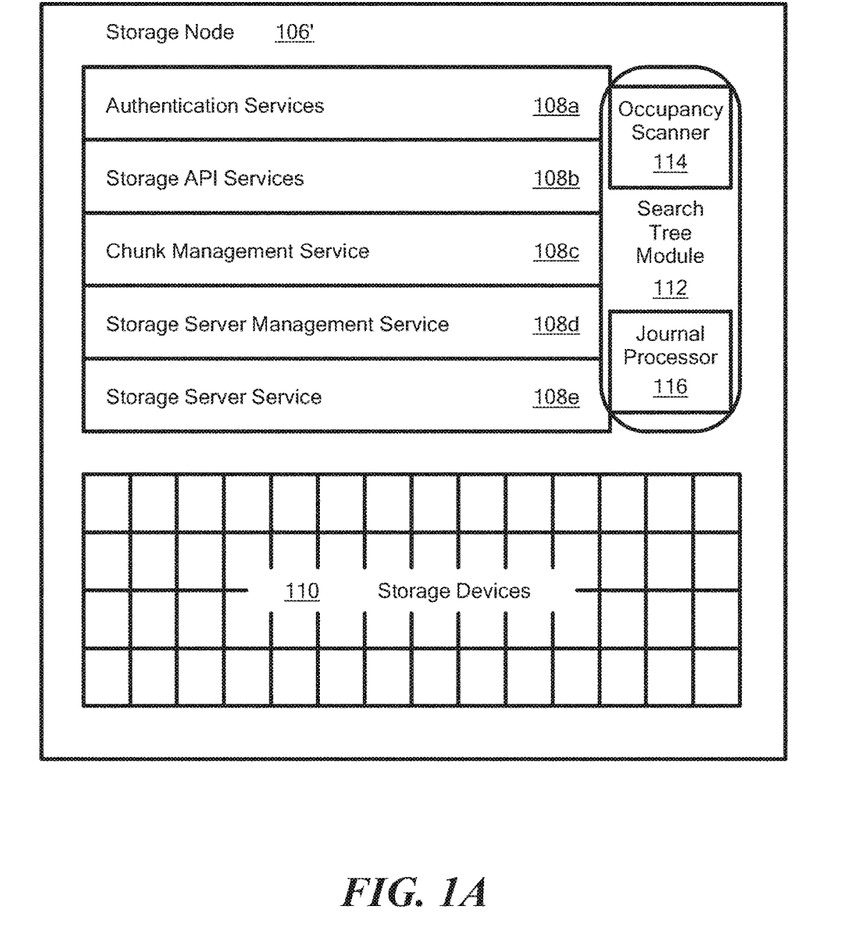
FIG. 1A is a block diagram of an illustrative storage node which may form a part of the distributed storage system of FIG. 1, in accordance with an embodiment of the disclosure.

FIG. 1 shows a distributed storage system, in accordance with an embodiment of the disclosure. An illustrative distributed storage system 100 includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems. The storage cluster 104 includes one or more storage nodes 106a . . . 106n (generally denoted 106). An illustrative storage node is shown in FIG. 1A and described below in conjunction therewith.

In general operation, clients 102 issue requests to the storage cluster 104 to read and write data. Write requests may include requests to store new data and requests to update previously stored data. Data read and write requests include an ID value to uniquely identify the data within the storage cluster 104. A client request may be received by any available storage node 106. The receiving node 106 may process the request locally and/or may delegate request processing to one or more peer nodes 106. For example, if a client issues a data read request, the receiving node may delegate/proxy the request to peer node where the data resides.

In various embodiments, the distributed storage system 100 comprises an object storage system, wherein data is read and written in the form of objects, which are uniquely identified by object IDs. In some embodiments, the storage cluster 104 utilizes Elastic Cloud Storage (ECS) from EMC Corporation of Hopkinton, Mass.

In some embodiments, the distributed storage system 100 provides a simple, yet safe, approach to garbage collection (GC) scope determination using structures and techniques shown in FIGS. 4-7 and described below in conjunction therewith.

FIG. 1A shows a storage node, in accordance with an embodiment of the disclosure. A storage node 106' may be the same as or similar to a storage node 106 in FIG. 1. The illustrative storage node 106' includes one or more services 108, one or more storage devices 110, and a search tree module 112. A storage node 106' may include a processor (not shown) configured to execute instructions provided by services 108 and/or module 112.

In the example shown, a storage node 106' includes the following services: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices capacity and to track storage devices states; and a storage server service 108e to interface with the storage devices 110.

A storage device 110 may comprise one or more physical and/or logical storage devices attached to the storage node 106a. A storage node 106 may utilize VNX, Symmetrix VMAX, and/or Full Automated Storage Tiering (FAST), which are available from EMC Corporation of Hopkinton, Mass. While vendor-specific terminology may be used to facilitate understanding, it is understood that the concepts, techniques, and structures sought to be protected herein are not limited to use with any specific commercial products.

The search tree module 112 includes hardware and/or software to provide search tree management and operations to the various services 108. In various embodiments, the search tree module 112 is provided as a library that is accessible by services 108. In some embodiments, the search tree module 112 implements a tracing garbage collection (GC) process. In addition to reclaiming unused storage, the garbage collector can reduce (and ideally eliminate) fragmentation by copying data between regions of storage while adhering to MVCC semantics.

In certain embodiments, the search tree module 112 may include a journal processor 116 operable to perform batch tree updates, as described below in conjunction with FIG. 3B.

In some embodiments, the search tree module 112 may include an occupancy scanner 114 to update tree references after a tree update. The operation of the occupancy scanner 114 is described further below in conjunction with FIGS. 4-7.

With reference to FIGS. 1 and 1A, various storage node services 108 work with so-called "tables" that contain key-value pairs. For example, an object storage system may utilize a so-called "object table" wherein the keys correspond to object IDs and the values correspond to object metadata and object data references. As used herein, the term "object data reference" refers to information about the location of object data within one or more storage devices 110.

A table may be shared across multiple storage nodes 106 (and, in some cases, all storage nodes 106) of a storage cluster 104. Individual storage nodes 106 can maintain a local copy of the table. A given storage node 106 may add/delete/modify a table entries, and then propagate the changes to peer nodes 106. To guarantee data consistency, a table may be owned by one of the storage cluster nodes 106. Non-owner nodes 106 can read from the shared table, however only the owner node can modify it. Table ownership can migrate from one node to another, for example when nodes are added to, or removed from, the storage cluster. The above-described functionality may be provided by the search tree module 112.

To provide efficient access to an arbitrary number key-value pairs, a table may be implemented using a search tree (e.g., a B+ tree) stored to disk.

Figure 2:
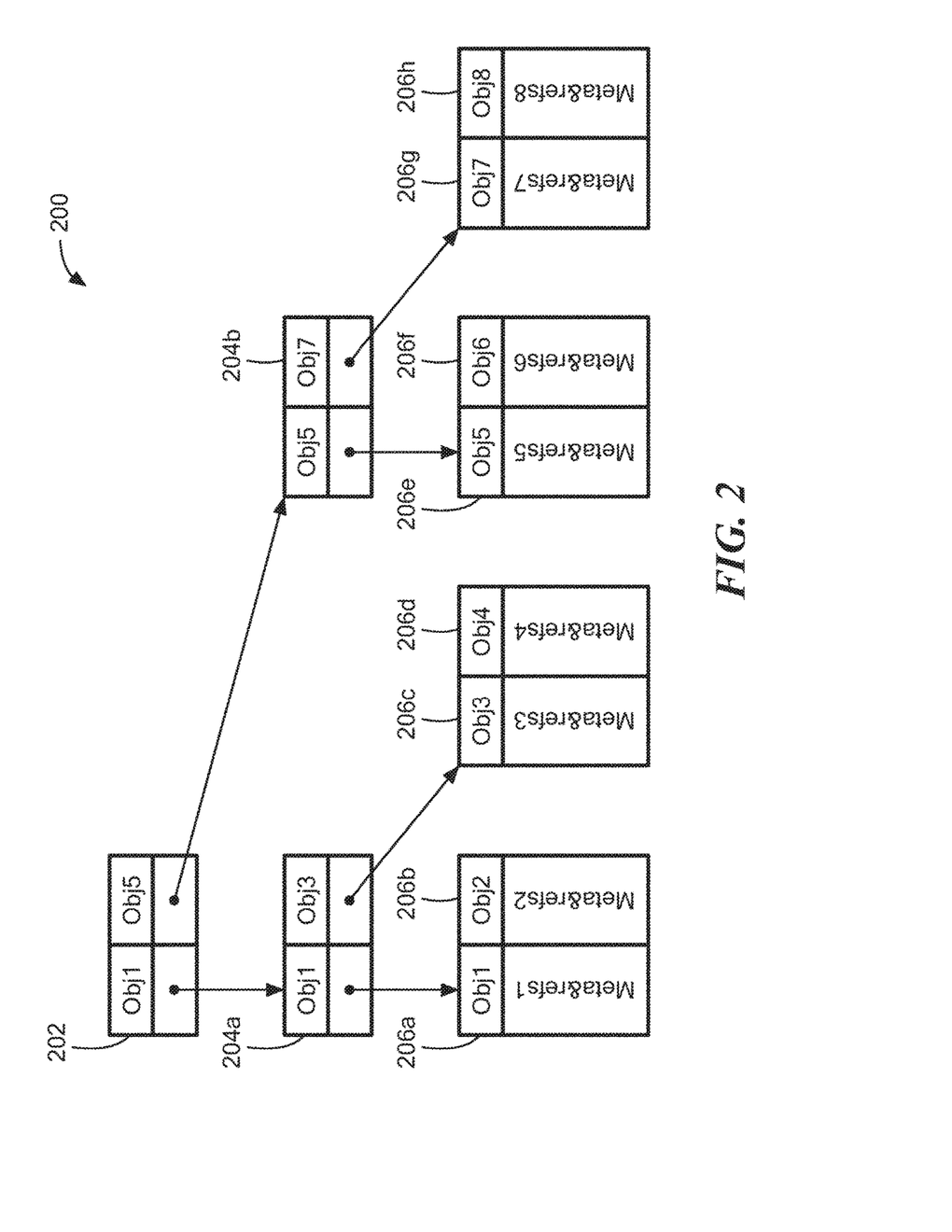
FIG. 2 is a diagram of an illustrative search tree, in accordance with an embodiment of the disclosure.

FIG. 2 shows an illustrative search tree 200 having a root node 202, internal nodes 204 (here, two internal nodes 204a and 204b), and leaves 206 (here, eight leaves 206a-206h). The nodes 202, 204 and leaves 206 are collectively referred to herein as "tree elements" and, in general, a search tree can include an arbitrary number of tree elements.

Each tree element stores one or more key-value pairs. The keys are referred to as "search keys." The type of information stored for a given value depends on the type of tree element. Within a root node 202 and internal nodes 204, values are references to other nodes 204 or to leaves 206. For example, as shown, internal node 204a includes two key-value pairs: search key "Obj1" references leaf 206a and search key "Obj3" references leaf 206c. Within leaves 206, values correspond to the actual data stored by the search tree. In the case of an Object Tree, the search keys may correspond to object IDs and the leaf values correspond to object metadata and object data references. For example, leaf 206a stores metadata for object ID "Obj1" in addition to the location of that object's data on disk.

It should be understood that search tree 200 is merely illustrative and that a typical search tree may include millions or even billions of tree elements.

Figure 3A:
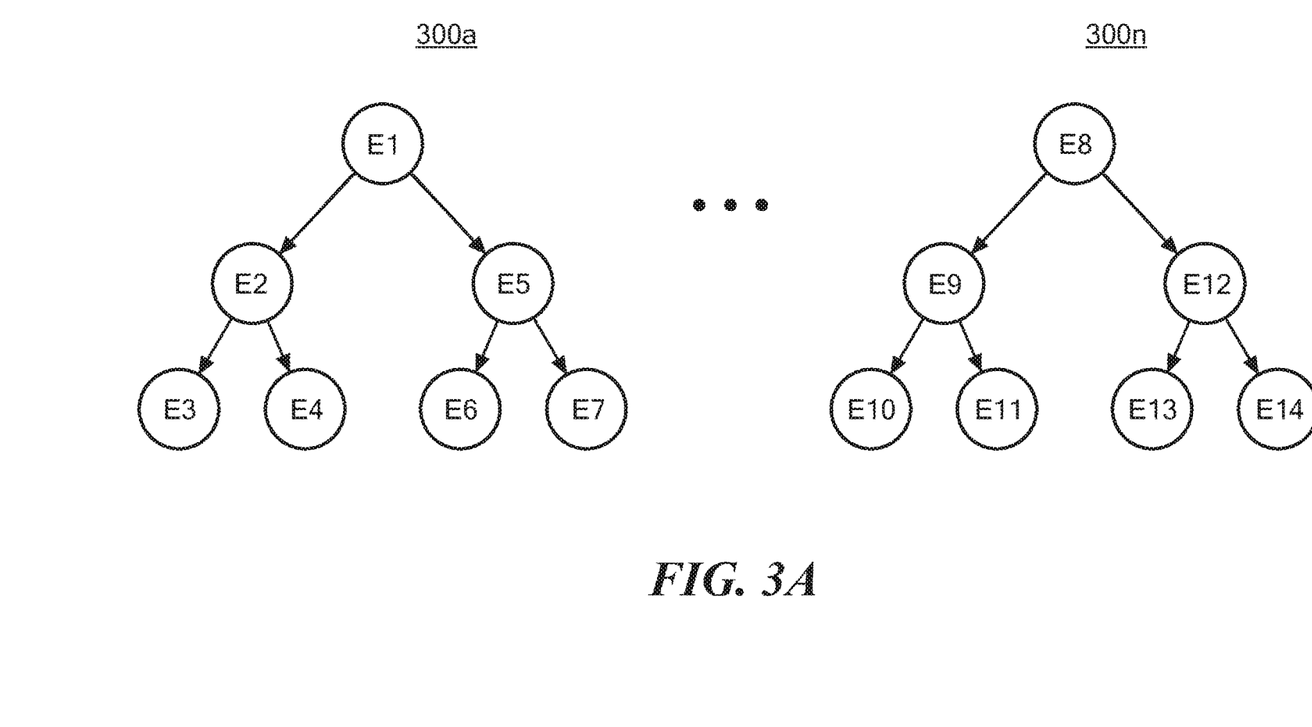
FIGS. 3A and 3B are diagrams showing how search trees may be stored on disk, in accordance with an embodiment of the disclosure.
Figure 3B:
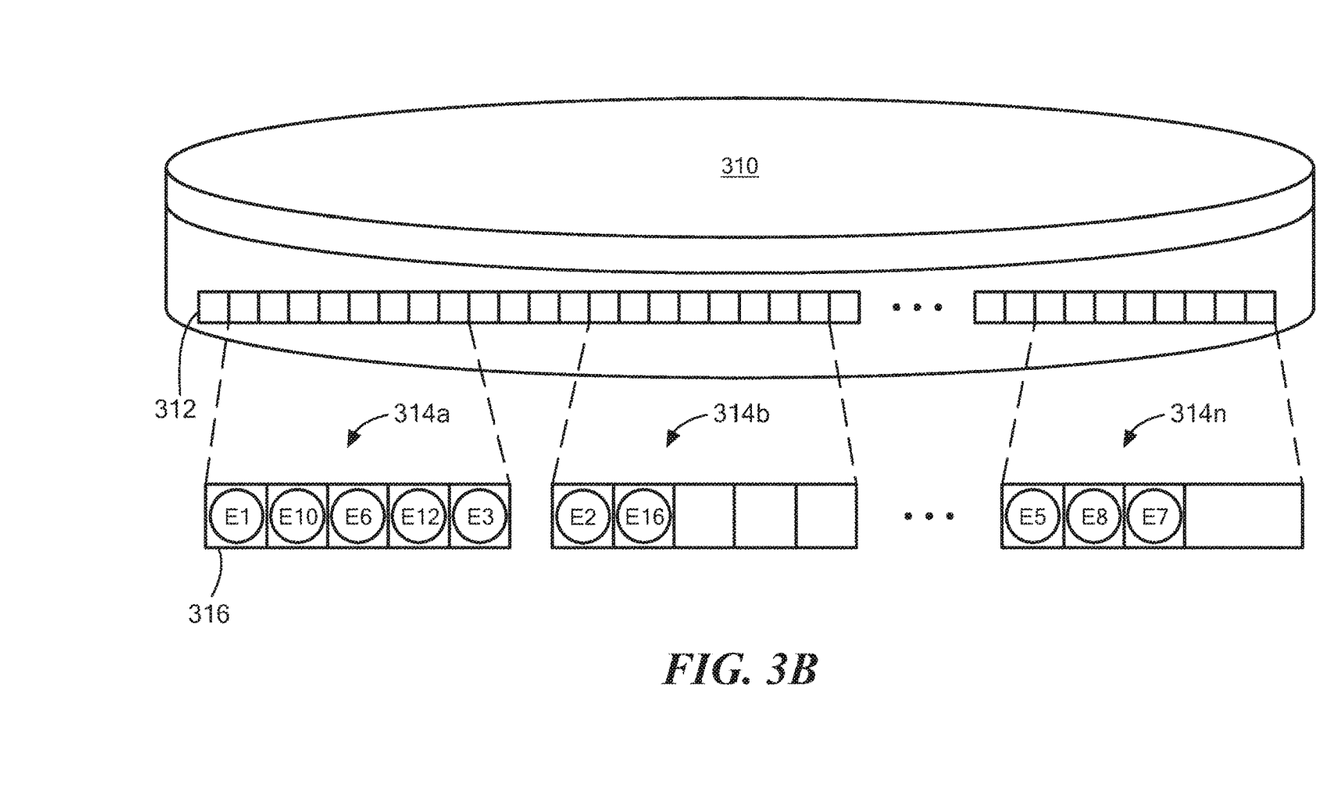

FIGS. 3A and 3B, together, illustrate how search trees may be stored within block storage devices, such as storage devices 110 of FIG. 1A.

FIG. 3A shows an arbitrary number of search trees, in accordance with an embodiment of the disclosure. An arbitrary number of search trees 300a . . . 300n (generally denoted 300) may be stored, with each search tree 300 having an arbitrary number of elements. In this example, a first search tree 300a includes elements E1-E7 and a second search tree 300b includes elements E8-E14, as shown.

FIG. 3B shows a block storage device, in accordance with an embodiment of the disclosure. With reference to FIG. 3A, search trees 300 can be stored within a block storage device 310, such as a hard disk. The block storage device 310 provides read and write access to fixed-size blocks 312. The block storage device 310 can be partitioned into a plurality of storage chunks 314a . . . 314n (generally denoted 314), wherein each storage chunk 314 corresponds to a fixed number of contiguous blocks 312. In the example shown, each storage chunk 314 corresponds to eight (8) contiguous blocks 312. In practice, a storage chunk 314 may correspond to more than eight (8) blocks 312.

Each element of a search tree 300 is stored within a page 316. As used herein, a "page" refers to a continuous portion of a storage chunk 314. The size of a page may vary depending on the data stored by the respective tree element. In various embodiments, each page 316 contains exactly one tree element.

A given storage chunk 314 may include elements from different search trees. For example, illustrative storage chunk 314a is show having elements E1, E6, and E3 from the first search tree 300a and elements E10 and E12 from the second search tree 300n. A storage chunk 314 may also include tree elements that are no longer referenced by any search tree 300 of interest to the storage system. Such elements are referred to as "unreferenced," "orphan", or "dead" elements. In the example of FIG. 3B, storage chunk 314b includes unreferenced tree elements E15 and E16.

To provide multi-version concurrency control (MVCC), elements of a search tree 300 are treated as immutable. Accordingly, all pages 316 (which contain tree elements) are also treated as immutable. New pages can be added (e.g., appended) to a storage chunk 314, however existing pages cannot be modified. When a storage chunk 314 becomes full (e.g., when there insufficient space to add a page 316), it is marked as "sealed." A sealed storage chunk 314 is treated as immutable within the storage system.

If a user changes data stored by a search tree 300, new pages 316 are allocated for the corresponding tree elements that are modified. In the case of a B+ search tree, new pages 316 are allocated for: (1) a new leaf for the new/modified user data; (2) a new root node; and (3) at least N–2 internal nodes, where N is the current depth of the search tree. The new root node and internal nodes are configured to provide a search path to the new leaf. Thus, a search tree update results in the creation of a new tree that may share elements with the previous tree. A search tree update also results in unreferenced tree elements and wasted storage capacity allocated for the corresponding pages 316. It is desirable to reclaim this unused page storage. Because sealed storage chunks 314 are treated as immutable, reclamation of unused storage can only occur at the storage chunk level, not at the page level.

After the new search tree is created (e.g., as a result of a data update), the occupancy scanner 114 (FIG. 1A) can traverse the new tree and updates reference counters for the corresponding storage chunks. Such reference counters, and additional metadata, may be stored in special purpose tables, such as the illustrative table shown in FIG. 6 and described below in conjunction therewith.

It will be appreciated that search tree updates can be expensive in terms of I/O overhead. To reduce this overhead, tree updates may be performed in bulk (i.e., "batched"). In some embodiments, each search tree 300 has an associated journal of data updates. A journal may be limited in size. When a journal becomes full, a journal processor 116 performs bulk tree updates in order to minimize the total cost of the update. The journal processor may be executed on a storage node 106 that owns the search tree. Journal updates should be as fast as possible to reduce impact on users.

Figure 4:
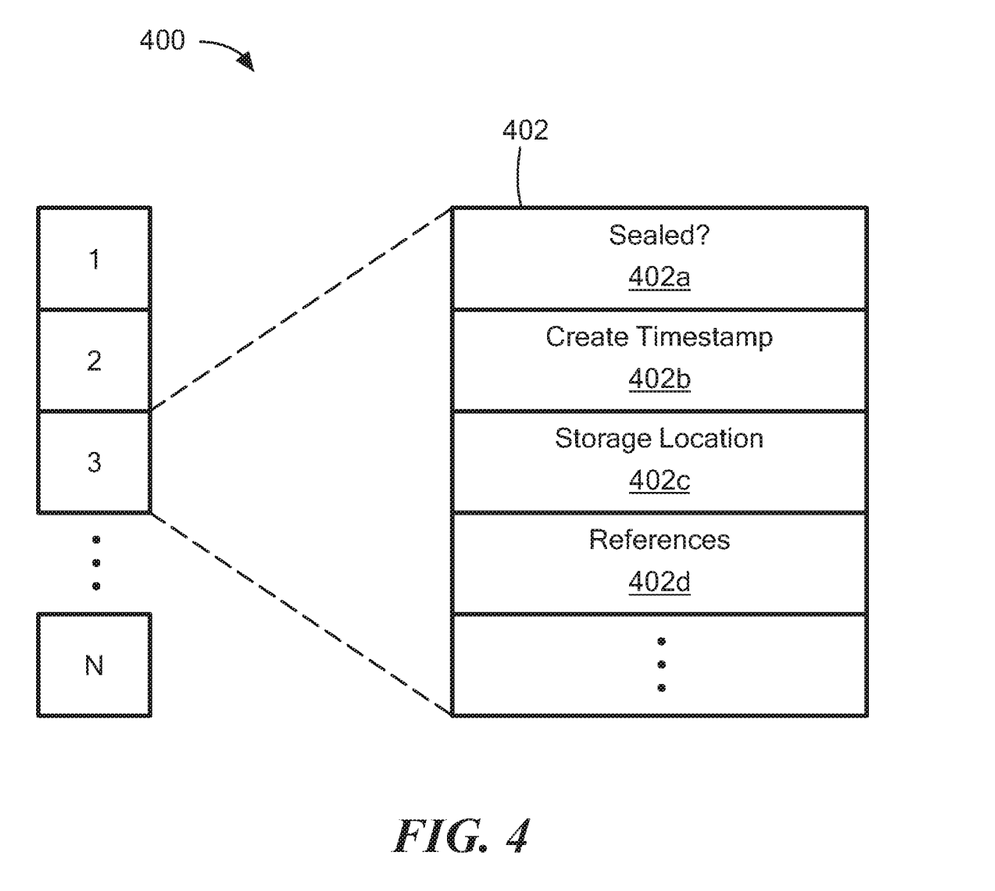
FIG. 4 is diagram of an illustrative data structure, in accordance with an embodiment of the disclosure.

Referring to FIG. 4, a data structure (referred to herein as a "chunk metadata table") may be used within the distributed storage system 100 (FIG. 1), according to some embodiments of the disclosure. An illustrative table 400 includes metadata 402 for one or more storage chunks 314. Per-chunk metadata 402 may be indexed by a unique value associated with each chunk. In some embodiments, each chunk is assigned a monotonically increasing sequence number (1, 2, 3, . . . , N), referred to as a "sequence number."

In the example shown, the metadata 402 includes a sealed flag 402a to indicate if a storage chunk is sealed, a create timestamp 402b to indicate the time the storage chunk was generated, a storage location 402c to indicate the location of the storage chunk within the node storage devices 110 (FIG. 1A), and reference counters 402d to indicate references to data stored within the chunk. Other per-chunk metadata could also be stored using a similar table structure. In certain embodiments, reference counters 402d are stored in a separate table from the chunk metadata.

When a new storage chunk is requested (e.g., as a result of a tree update), the chunk management service 108c (FIG. 1A) may assign a new sequence number (e.g., N+1, where N is the last sequence number assigned) and add a corresponding entry to the chunk metadata table 400. The storage chunk's metadata 402 may be initialized to indicate that the new chunk is not sealed (402a), that that chunk was generated at the current time (402b), and the location of the chunk within a storage device (402c). Subsequently (e.g., after the tree update completes), the occupancy scanner 113 (FIG. 1A) may traverse the search tree and update the reference counters 402d for data stored in the storage chunk. When the storage chunk becomes sufficiently full, the chunk's metadata (e.g., metadata 402a) may be updated to indicate the chunk is sealed. In some embodiments, chunks are sealed after a timeout expires, i.e., after a predetermined amount of time passes, which may be determined using the create timestamp 402b.

The information in chunk metadata table 400 can be used to determine GC scope in an efficient manner. As used herein, the term "GC scope" refers to the set of storage chunks that are considered during garbage collection. In the case of a distributed storage system 100 using the chunk storage model and search tree semantics described above, there are two conditions that should be met before a storage chunk can be safely considered for GC. First, the chunk should stop accepting new data and become immutable (i.e., sealed). Second, all the references to data stored within the chunk should be updated. The second requirement results from the fact that, even though a chunk may be sealed, a tree update may cause data within the chunk to become referenced or unreferenced.

Various techniques may be used to determine GC scope. According to one technique, each storage chunk 314 (FIG. 3B) within the distributed storage system can be checked for the two conditions described above. According to another technique for determining GC scope, the system may maintain a list of storage chunks not ready for GC. It will be appreciated that these approaches may be prohibitively expensive in terms of required processing time and/or memory.

Figure 5:
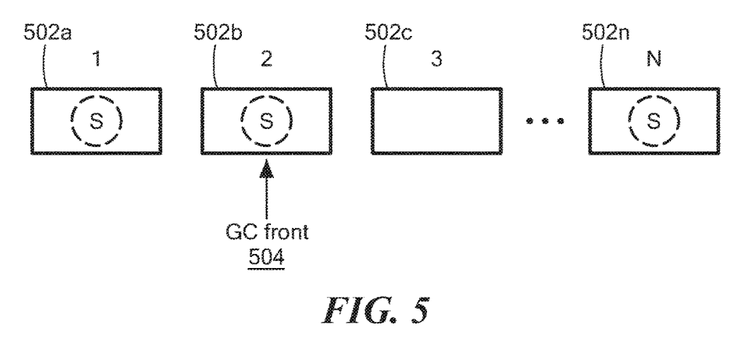
FIGS. 5 and 6 are diagrams illustrating technique for determining garbage collection (GC) scope, in accordance with an embodiment of the disclosure.

Referring to FIG. 5, according to some embodiments of the disclosure, a distributed storage system utilizes a criterion to efficiently determine GC scope. A unique value (referred to as a "sequence number") is associated with each storage chunk. In some embodiments, the chunk management service 108c assigns a monotonically increasing sequence number to each storage chunk that it generates. In the example shown, storage chunks 502a, 502b, 502c, . . . , 502n have corresponding sequence numbers 1, 2, 3, . . . N. The chunk sequence numbers may be used to establish a GC scope criterion: only storage chunks having a sequence number less or equal to a given cutoff value are considered for GC. The cutoff value, which is referred to herein as the "GC front" 504, unambiguously defines GC scope.

In various embodiments, the GC front 504 is selected to be the maximum sequence number from the set of consecutive sealed storage chunks beginning from the first storage chunk (e.g., the storage chunk having sequence number one (1)). For example, referring to FIG. 4, if storage chunks 502a, 502b, 502n are sealed but intervening storage chunk 502c is not, the GC front 504 would be set to the value two (2). As this example illustrates, the order of sealing events is not guaranteed in a distributed storage system; a chunk with a given sequence number may be sealed before a different storage chunk with a lower sequence number. During garbage collection, storage chunks 502c . . . 502n that are ahead of the GC front 504 are not considered. This approach to defining the GC scope is of relatively low complexity. A tradeoff is that not all sealed may be considered during GC. For example, sealed storage chunk 502n, which may no longer be used, is excluded from GC.

In some embodiments, the sequence number is used as the index into the chunk metadata table 400 (FIG. 4). This allows for efficiently looking up information (e.g., the storage location) of all storage chunks behind the GC front 504.

The above-described technique for determining GC scope may be extended to account for tree updates. A tree update involves writing data to storage chunks: either appending to existing chunks or generating new chunks. In addition, because a tree update may update the references to data stored within one or more storage chunks, it is also necessary to run the occupancy scanner 114 to update data references within chunk metadata tables (e.g., references 402d in table 400 of FIG. 4).

When there are no tree updates in progress, the GC front 504 can be safely incremented as additional storage chunks are sealed. However during a tree update, even if a chunk is sealed, references to its data may be missing from the chunk metadata table 400 until the occupancy scanner 114 finishes its work.

Figure 6:
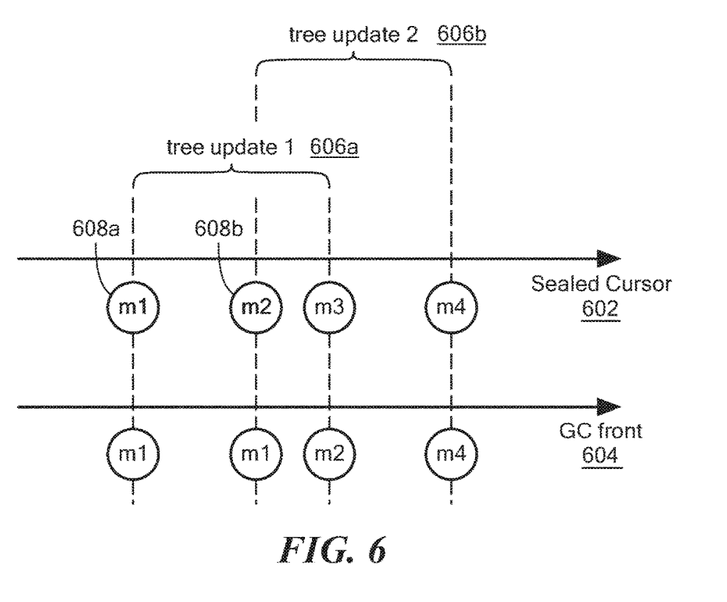

FIG. 6 illustrates a technique for blocking GC front during tree updates, according to some embodiments of the disclosure. A so-called "sealed cursor" 602 is maintained separate from the GC front 604. The sealed cursor 602 corresponds to the maximum sequence number from the set of consecutive sealed storage chunks beginning from the first storage chunk. The sealed cursor 602 may be advanced (e.g., incremented) immediately after an additional storage chunk is sealed.

In the nominal case, the value of the sealed cursor 602 and the GC front 604 are identical. When a tree update commences, the GC front 604 is blocked, meaning it cannot be advanced until the tree update completes. The sealed cursor 602, however, may be advanced during tree updates as a result of other processing within the system (e.g., chunks being sealed due to timeouts). After a tree update completes, the block is removed and the GC front 604 may advance to the current position of the sealed cursor 602.

The technique allows for parallel tree updates, meaning updates to multiple search trees and/or multiple updates to a single search tree that occur, at least in part, during overlapping time intervals. Each tree update sets its own block at the position of the sealed cursor 602 when that update begins. After a given tree update completes, its block may be removed and the GC front 604 can advance to the next GC front block (or to the sealed cursor 602 position if no other blocks exist).

FIG. 6 shows an example of two tree updates 606a and 606b that overlap in time (i.e., they are processed in a parallel manner). When a first update 606a commences, the sealed cursor 602 is at position m1 and when the first update 606a completes, the sealed cursor 602 is at position m3. When a second update 606b commences, the sealed cursor 602 is at position m2 and when the second update 606b completes, the sealed cursor 602 is at position m4. It is assumed that m1<m2<m3<m4.

The first update 606a update sets a block 608a at m1 and the second update 606b sets a separate block 608b at m2. The GC front 604 is blocked at m1 until the first update 606a completes. At this point, the first update 606a removes its block 608a and the GC front 604 can advance to the second update's block 608b. The GC front 604 blocked at m2 until the second update 606b completes, at which time the GC front 604 can advance to the current position of the sealed cursor 602.

Figure 7A:
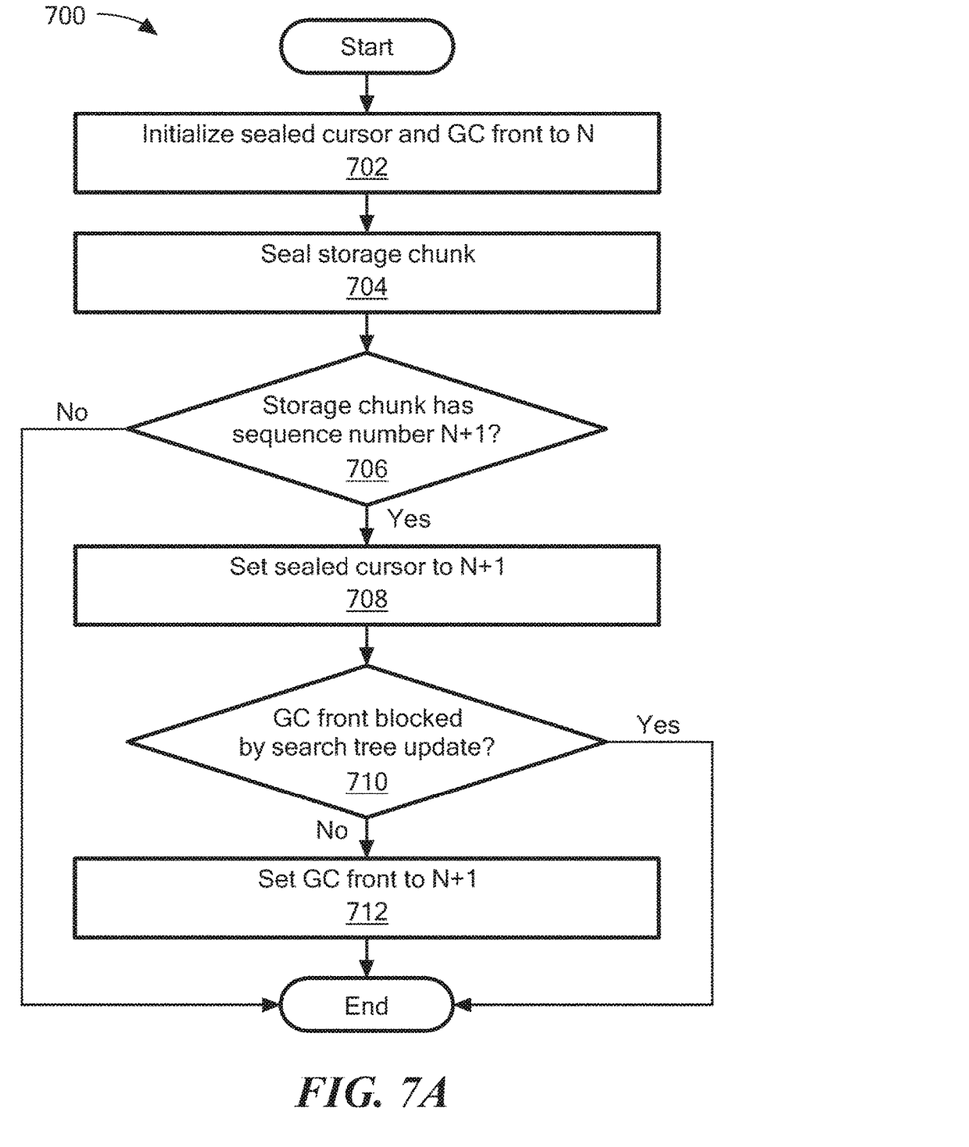
FIGS. 7A-7C are a flow diagrams showing illustrative processes that may be used within the distributed storage system of FIG. 1, in accordance with an embodiment of the disclosure.
Figure 7B:
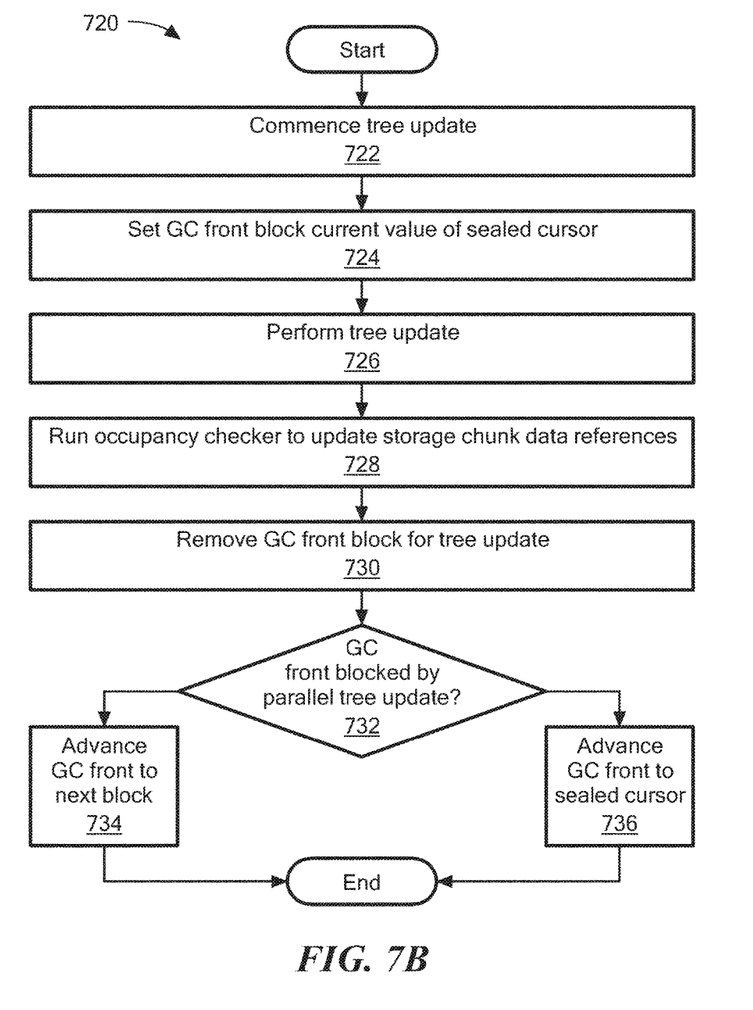
Figure 7C:
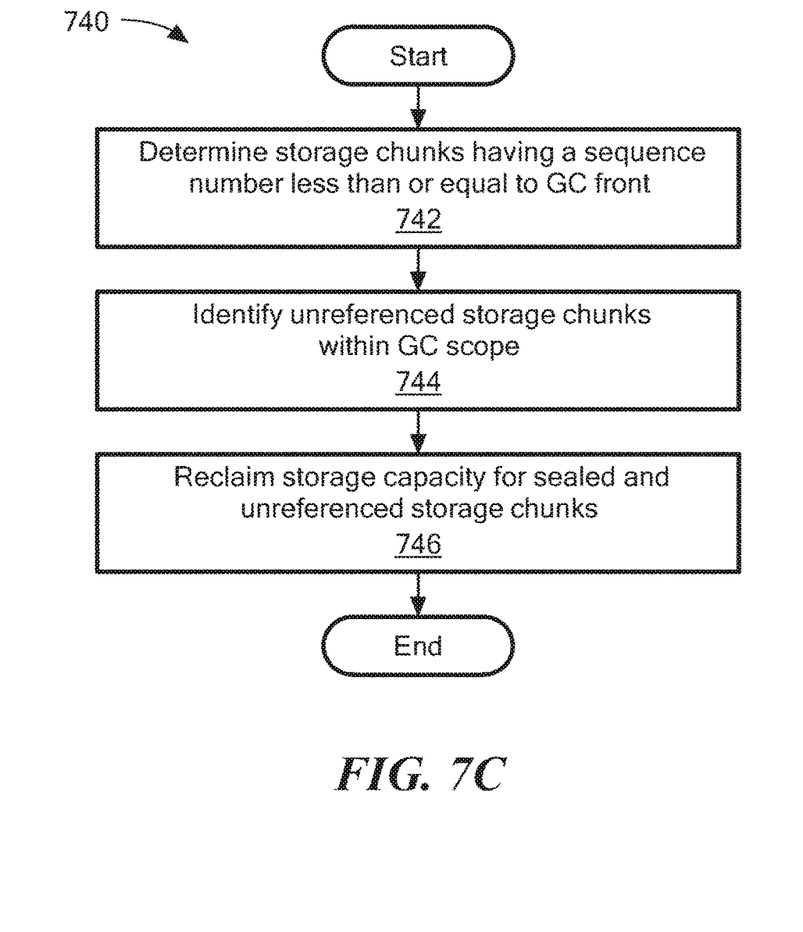

FIGS. 7A-7C are flow diagrams showing illustrative processing that can be implemented within a storage cluster 104 (FIG. 1) and, more particularly, within a search tree module 112 (FIG. 1A) of one or more storage nodes 106.

Rectangular elements (typified by element 702 in FIG. 7A), herein denoted "processing blocks," represent computer software instructions or groups of instructions. Diamond shaped elements (typified by element 706 in FIG. 7A) herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

FIG. 7A shows an illustrative process 700 for sealing storage chunks and advancing the GC front, in accordance with an embodiment of the disclosure. For clarity of explanation, process 700 is described in the context of sealing a one storage chunk at a time. However, essentially the same process can be used to seal multiple storage chunks at a time.

At block 702, the sealed cursor 602 (FIG. 6) and the GC front 604 may be initialized to the maximum sequence number from the set of consecutive sealed storage chunks beginning from the first storage chunk. This value is denoted N in the figure. At block 704, a storage chunk is sealed. This may include updating a chunk metadata table (e.g., metadata 402a in table 400 of FIG. 4).

If, at block 706, the sequence number of the newly sealed storage chunk is consecutive with the sealed cursor, then the sealed cursor can be advanced to the chunk sequence number (block 708). For example, a sealed cursor having value N may be incremented if the chunk sequence number is N+1. At block 710, the GC front can be immediately advanced to the sealed cursor position (block 712) if GC front is not currently blocked by any tree updates.

FIG. 7B shows an illustrative process 720 for blocking GC front during tree updates, in accordance with an embodiment of the disclosure. At block 722, a tree update commences. This may occur, for example, when the journal processor 116 (FIG. 1A) becomes full of tree updates. At block 724, the GC front 604 (FIG. 6) is blocked at the current position of the sealed cursor 602. At block 726, the tree update is performed, which may include generating new storage chunks and/or appending to existing storage chunks. As storage chunks become full, they may be sealed, as described above in conjunction with FIG. 7A. At block 728, the occupancy scanner 114 (FIG. 1) traverses one or more search trees to update references to data stored within storage chunks. This may include updating a chunk metadata table (e.g., metadata 402d in table 400 of FIG. 4). At block 730, the block on the GC front associated with this particular tree update may be removed. If, at block 732, GC front is blocked by parallel tree updates, the GC front 604 may be advanced to the position of the next block (734). Otherwise, the GC front 604 may be advanced to the current position of the sealed cursor 602.

FIG. 7C shows an illustrative process 740 for determining GC scope and using GC scope to reclaim storage capacity, in accordance with an embodiment of the disclosure. At block 742, the GC front 604 is used to determine GC scope. In some embodiments, the garbage collector identifies storage chunks having a sequence number less than or equal to the GC front 604. This may include looking up chunk information using a chunk metadata table (e.g., table 400 of FIG. 4) using sequence number indexes. The storage chunks within the GC scope are guaranteed to be sealed, but are not guaranteed to be unreferenced (i.e., unused). Thus, at block 744, from the set of GC scope storage chunks, a subset of unreferenced storage chunks may be identified. Block 744 may leverage the reference information determined by the occupancy scanner 114 and stored in a chunk metadata table 400 (FIG. 4). Alternatively, the garbage collector could traverse one or more search trees to identify unreferenced chunks. In either case, the GC front semantics described above guarantee that the garbage collector will not miss may data references. At block 746, the storage capacity allocated to the sealed and unreferenced storage chunks may be safely reclaimed.

It should be appreciated that the processes 700, 720, and 740 of FIGS. 7A-7C can be used in combination with and/or in parallel with each other. For example, process 700 (FIG. 7A) may be performed to seal chunks after a timeout expires. At the same time, process 720 (FIG. 7B) may be performed when the journal processor 116 becomes full of tree updates. Also at the same time, process 740 (FIG. 6C) may be performed periodically when a GC scheduler determines that GC should be run.

Figure 8:
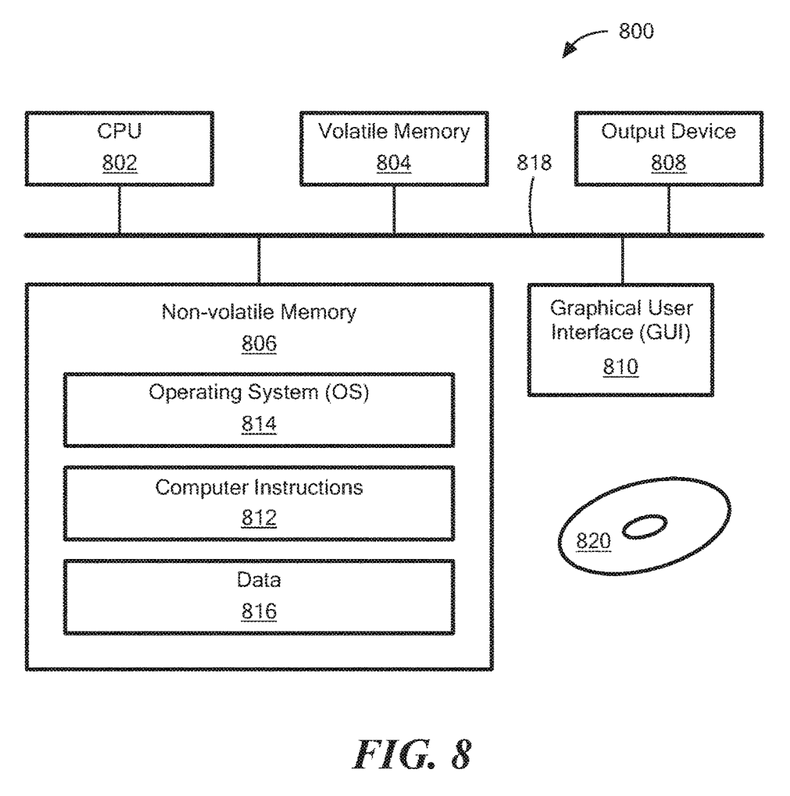
FIG. 8 is a schematic representation of an illustrative computer for use with the systems of FIGS. 1 and 2, in accordance with an embodiment of the disclosure.

FIG. 8 shows an illustrative computer or other processing device 800 that can perform at least part of the processing described herein, in accordance with an embodiment of the disclosure. The computer 800 includes a processor 802, a volatile memory 804, a non-volatile memory 806 (e.g., hard disk), an output device 808 and a graphical user interface (GUI) 810 (e.g., a mouse, a keyboard, a display, for example), each of which is coupled together by a bus 818. The non-volatile memory 806 stores computer instructions 812, an operating system 814, and data 816. In one example, the computer instructions 812 are executed by the processor 802 out of volatile memory 804. In one embodiment, an article 820 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Although the systems and processes sought to be protected herein are described in conjunction with search trees and corresponding tree storage chunks, it should be understood these systems and processes are also applicable to various other types of storage chunks, including but not limited to: repository chunks to store user data; replication chunks to store data replicated from remote locations; recovery chunks used for data regeneration; erasure coding (EC) and XOR chunks for replication data protection; tree chunks to store B+ trees; and journal chunks to store tree journals.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method for use with a distributed storage system comprising a plurality of storage devices, the method comprising:
    initializing a garbage collection (GC) front value as the maximum sequence number associated with a storage chunk within a set of consecutively sealed storage chunks, the storage chunks corresponding to storage capacity allocated within the storage devices and having associated sequence numbers;
    using the GC front value to determine GC scope, the GC scope including zero or more of the storage chunks;
    retrieving metadata information about the GC scope storage chunks;
    identifying unreferenced storage chunks from the GC scope storage chunks using the metadata information; and
    reclaiming storage capacity corresponding to the unreferenced storage chunks.

2. The method of claim 1 further comprising:
    sealing additional storage chunks; and
    advancing the GC front value if the additional sealed storage chunk have sequence numbers consecutive to a previous GC front value.

3. The method of claim 2 wherein the storage chunks are used to store search tree elements, wherein advancing the GC front value comprises advancing the GC front value unless a search tree is being updated.

4. The method of claim 3 further comprising:
    setting a first GC front block when a first search tree update commences; and
    setting a second GC front block when a second search tree update commences,
    wherein advancing the GC front value comprises advancing the GC front value after the first search tree update completes to the value of the second GC front block.

5. The method of claim 2 wherein sealing additional storage chunks comprises sealing additional storage chunks in response to a timeout expiring.

6. The method of claim 1 wherein retrieving metadata information about the GC candidate storage chunks comprises looking up metadata information in a metadata table using storage chunk sequence numbers.

7. A distributed storage system comprising:
    a plurality of storage devices;
    two or more storage nodes configured to:
        initialize a garbage collection (GC) front value as the maximum sequence number associated with a storage chunk within a set of consecutively sealed storage chunks, the storage chunks corresponding to storage capacity allocated within the storage devices and having associated sequence numbers;
        use the GC front value to determine GC scope, the GC scope including zero or more of the storage chunks;
        retrieve metadata information about the GC scope storage chunks;

identify unreferenced storage chunks from the GC scope storage chunks using the metadata information; and reclaim storage capacity corresponding to the unreferenced storage chunks.

8. The distributed storage system of claim 7 wherein the two or more storage nodes are further configured to:

seal additional storage chunks; and advance the GC front value if the additional sealed storage chunk have sequence numbers consecutive to a previous GC front value.

9. The distributed storage system of claim 8 wherein the storage chunks are used to store search tree elements, wherein the two or more storage nodes are configured to advance the GC front value unless a search tree is being updated.

10. The distributed storage system of claim 9 wherein the two or more storage nodes are configured to:

set a first GC front block when a first search tree update commences;

set a second GC front block when a second search tree update commences; and advance the GC front value after the first search tree update completes to the value of the second GC front block.

11. The distributed storage system of claim 8 wherein the two or more storage nodes are configured to seal additional storage chunks in response to a timeout expiring.

12. The distributed storage system of claim 7 wherein the two or more storage nodes are configured lookup metadata information in a metadata table using storage chunk sequence numbers.

* * * * *